United States Patent
Kroll et al.

(10) Patent No.: US 6,681,911 B2
(45) Date of Patent: Jan. 27, 2004

(54) VIBRATION DAMPING DEVICE, IN PARTICULAR TORSIONAL VIBRATION DAMPER AND PROCESS FOR CONTROLLING HYSTERESIS

(76) Inventors: Juergen Kroll, Ulmengasse 1, 68775 Ketsch (DE); Norbert Bastel, Thurn-und-Taxis-Str. 42, 68794 Oberhausen-Rheinhausen (DE); Michael Schaefer, Mannheinerstr. 74, 68723Schwetzingen (DE)

( * ) Notice: Subject to any disclaimer, the term of this patent is extended or adjusted under 35 U.S.C. 154(b) by 0 days.

(21) Appl. No.: 09/896,287

(22) Filed: Jun. 29, 2001

(65) Prior Publication Data

US 2002/0011391 A1 Jan. 31, 2002

(30) Foreign Application Priority Data

Jul. 31, 2000 (DE) .......................................... 100 37 646

(51) Int. Cl.⁷ ................................................. F16H 3/14
(52) U.S. Cl. ........................ 192/85 A; 469/68; 469/24; 192/201
(58) Field of Search ................................. 192/202, 201, 192/214.1, 85 AB, 85 A, 212, 106 F; 464/68, 24

(56) References Cited

U.S. PATENT DOCUMENTS

| | | | | |
|---|---|---|---|---|
| 4,465,172 A | * | 8/1984 | Gatewood | 192/103 R |
| 4,640,402 A | * | 2/1987 | Hartig et al. | 192/110 R |
| 4,697,682 A | * | 10/1987 | Alas et al. | 192/202 |
| 4,715,485 A | * | 12/1987 | Rostin et al. | 192/110 R |
| 4,924,990 A | * | 5/1990 | Takeuchi | 192/201 |
| 5,007,517 A | * | 4/1991 | Flotow | 192/110 R |
| 5,810,140 A | * | 9/1998 | Billet et al. | 192/205 |
| 5,826,688 A | * | 10/1998 | Arhab et al. | 192/212 |
| 5,971,857 A | * | 10/1999 | Friedmann et al. | 192/213.2 |
| 6,026,710 A | * | 2/2000 | Orlamunder et al. | 192/214.1 |
| 6,106,430 A | * | 8/2000 | Peinemann | 192/201 |
| 6,293,870 B1 | * | 9/2001 | Nagano et al. | 464/68 |

* cited by examiner

Primary Examiner—Rodney H. Bonck
Assistant Examiner—Eric M. Williams

(57) ABSTRACT

The invention concerns a vibration damping device (2). This includes at least two elements—a primary element (3.1) and a secondary element (3.2), which are limited in movement in relation to each other. The primary element (3.1) and the secondary element (3.2) can be coupled together using a spring coupling. The means to implement spring coupling include at least one spring device (4.1, 4.N).

Based on the invention, there is at least one adjustable clutch device (15, 15'), including at least two elements (16, 17; 16', 17') rubbing against each other, which bring primary and secondary elements (3.1, 3.2) into friction contact. In addition, there is a power generator or force producing device (39) to produce a controllable friction contact for the elements rubbing against each other (16, 17; 16', 17').

22 Claims, 6 Drawing Sheets

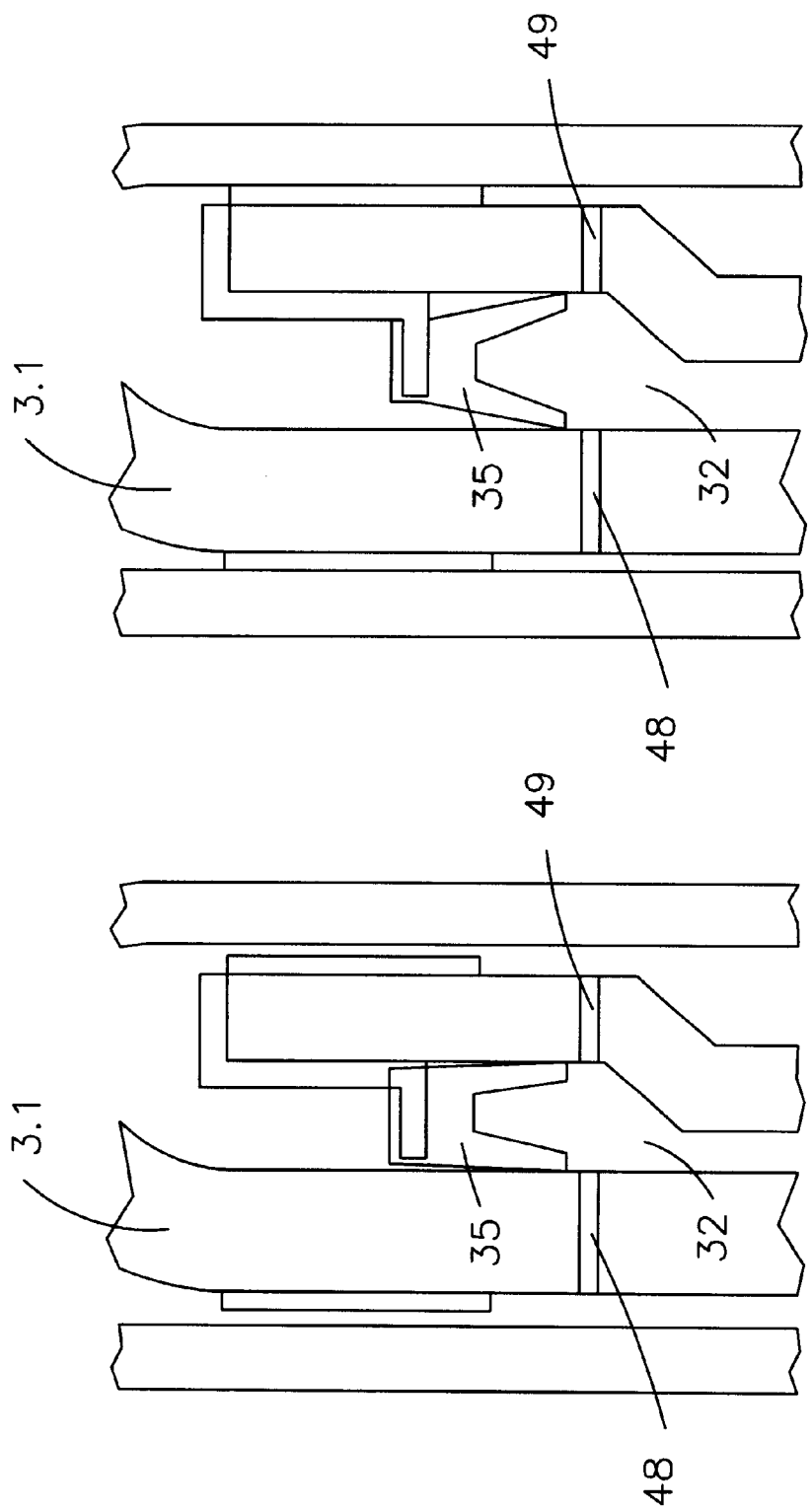

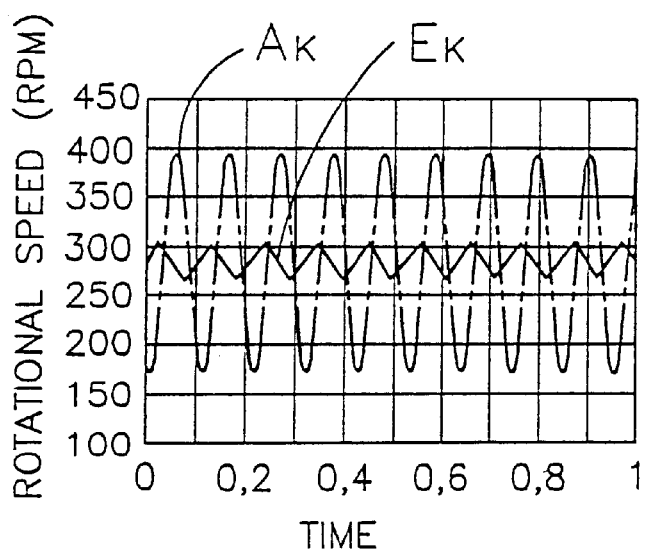
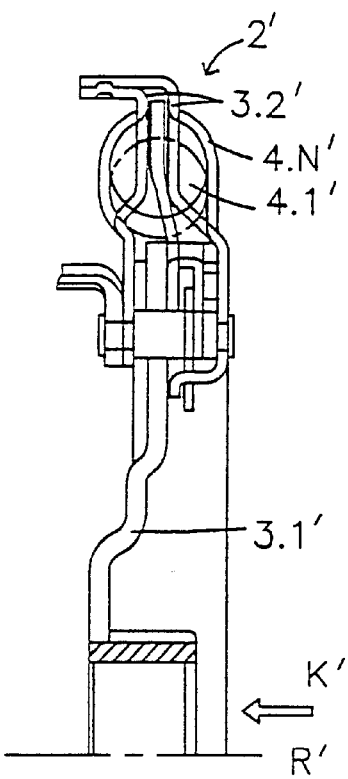
*Fig. 5a* (PRIOR ART)
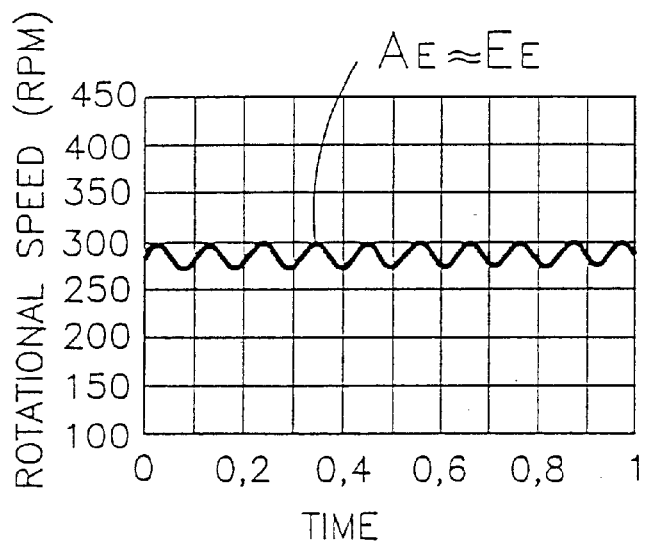
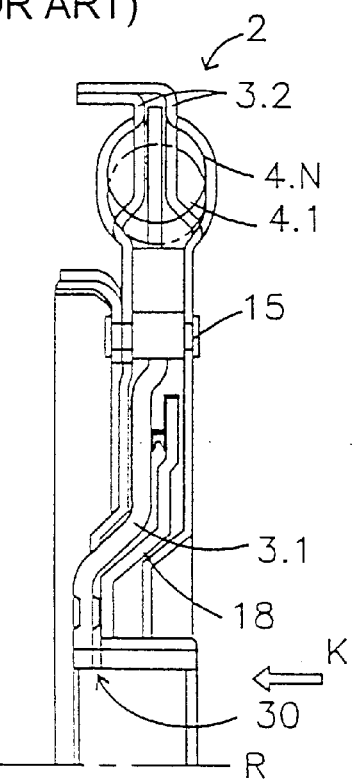
*Fig. 5b*

VIBRATION DAMPING DEVICE, IN PARTICULAR TORSIONAL VIBRATION DAMPER AND PROCESS FOR CONTROLLING HYSTERESIS

BACKGROUND OF THE INVENTION

1. Field of the Invention

The invention concerns a device for damping vibrations or oscillations, especially a torsional vibration damper to dampen rotating components, a drive system for vehicles and also a process for controlling the hysteresis of a vibration damping device.

2. Description of the Related Art

Devices to dampen vibrations are known in numerous applications. See, for example, the publication from Borg Warner Automotive: Torsionsschwingungsdämpfer (Torsional Vibration Dampers), 0691W, 1991.

The expression "vibration damping device" should be interpreted in the most general manner. In general, a type of elastic clutch is used, which is arranged between two components in a drive train, for example an internal combustion engine and a transmission. Such devices serve to hinder vibrations from the internal combustion engine from transferring to the rest of the drive train. These must be set in such a manner that the critical torque of the entire dimensional system is far enough below the operational area.

The known vibration damping device includes at least two elements: a primary element and a secondary element, which can be coupled together using a spring mechanism, and which can be rotated against each other circumferentially within a limited angle. The spring mechanism also ideally includes a number of springs, which are ideally arranged at a set distance from each other, in a circle coaxial to the damper axle in the circumference direction. Due to the spring clutch, a transfer of torque occurs, through which a damping affect is additionally achieved in specific measure, due to the spring characteristics. When such a device is used in drive trains for vehicles, it has been shown that the availability of a high friction moment in the drive train is necessary to decrease the vibration amplitudes in the resonant range. However, the result of this is a decrease in driving comfort at higher rotational speeds.

Dependent upon the layout of such devices to dampen vibrations, especially the amount of spring rigidity and the size of the secondary mass, problems were observed in starting the propelling engine, which become obvious during winding up or stretching the damper and the following overshoot or overswing, where the component strength could be surpassed.

SUMMARY OF THE INVENTION

Therefore, the invention is based on the assignment to further develop a vibration damping device in such a manner that the disadvantages in prior art are avoided. Specifically, an optimal adjustment to concrete uses towards high operational safety as well as availability should be achieved in regards to the vibrations that need to be dampened over the entire operational area or a part of the operational area, especially in the area of lower engine rotational speeds. The design layout should be characterized by minimal need for space, simple assembly and above all, minimal expenses.

The vibration damping device includes at least two elements—a primary element and a secondary element—which may be movable to a limited extent relative to each other and in the case of a torsional vibration damper can be rotated to a limited extent in the circumference direction in relation to each other. The first primary element and the second secondary element can be coupled together using a spring coupling. The means to realize the spring coupling include at least one spring device, and in the case of a torsional vibration damper ideally a number of spring devices, arranged circumferentially around the two elements—the primary and secondary elements.

Based on the invention, at least one adjustable coupling or clutch device is integrated in the vibration damping device, including at least two elements rubbing against each other—a first element and a second element—, which bring the primary and secondary elements (3.1, 3.2) into frictional contact with each other. In addition, a power generator is assigned to the elements rubbing against each other to create a controlled friction contact between the elements rubbing against each other. Control should be interpreted as not only the steerability but also the controllability of the friction engagement or an interference of these possibilities The power generator ideally includes a control device, which functions as adjustor of a control device, ideally an electronic one.

The terms "primary element" and "secondary element" refer to the arrangement and function of these elements in the power flow direction in the traction operation of a propelling engine or propelling unit of the drive. The primary element is connected with the input side, while the secondary element is coupled with the output side. The functions of the moment of force or torque inlet or outlet could, however, depending on operation of the drive train (traction operation or tow operation), also be taken over by a different element, i.e. these are not tied to the primary or secondary element.

There are numerous possibilities in regards to detailed design applications of the primary element and the secondary elements. Ideally, these are mainly designed to be disk-shaped.

An especially preferred design with a minimal number of components has at least one element of the coupling or clutch device being formed by one of the two elements—primary element or secondary element. However, separate frictional engaging elements are also possible.

The inventive solution makes it possible to influence the achieved damping effect in the vibration damping device, in regards to its magnitude size and/or operation over the entire operational area of the propelling engine, and thereby to control the parameters of the vibration amplitudes, in dependence on certain physical parameters in the drive train, for example the speed and/or load of the propelling engine or unit, that cause the friction force or friction moment using the clutch device (friction clutch).

The control/steering conversion technology determines the point in time to operate the friction clutch. In an additional aspect of the invention, the amount of pressure can also be control/steered in a targeted manner to create a corresponding friction moment. This requires the use of a corresponding control/steering concept in regards to the closing the friction clutch and/or the operational force to be used.

Ideally, the secondary element includes in its design at least two lateral disks that can ideally be torsionally fixed to (frictionally engage) each other. The primary element is then arranged axially between the two lateral disks. One element of the clutch device is formed by at least one of the two lateral disks of the secondary element. Ideally, the friction contact of the friction clutch occurs with one of the two elements, here the secondary element, having an even force effect, including the other of the two elements, in this case the primary element. An additional element of the clutch device is formed by a piston element that is torsionally fixed to the primary element, in the case of a torsional vibration damper, and that can be moved in an axial direction. The striking surface of the elements rubbing together which are formed from the lateral disks of the secondary element, are arranged to the surfaces facing the primary element, while the striking surfaces of the elements rubbing together which are formed by the primary element and the piston element are each arranged on the lateral surfaces of these elements, that face the inner surface of the secondary element or the surfaces opposite the lateral disks.

Ideally, the clutch device is a disk clutch.

This means that the striking or frictional engaging surfaces are arranged on the disk-shaped elements. The execution of the striking surfaces are carried out radially in such a manner, that the striking surfaces of at least the elements having the striking surfaces which are immediately in friction contact with each other are ideally arranged the same radial distance from each other.

There are numerous possibilities in regards to execution and function of the means to create an adjustable pressure. In an especially beneficial design, the friction engagement occurs through hydraulic operation of the friction clutch. Alternatively, the operation can occur using electro-magnetics, especially rheo-magnetics. For that, at least one operational device is present for at least the indirect realization of the friction contact between the elements rubbing together. This device has a pressure device that strikes a pressure chamber in order to produce the friction contact between the elements that are rubbing together, and that moves one of the rubbing elements in the opposite axial direction of the other, and in doing so achieves contact pressure. The pressure chamber is formed between the piston element that is torsionally fixed to the primary element and can be moved axially and the primary element. In addition, means to seal the pressure chamber in radial direction are necessary. The pressure medium is ideally provided through line channels that are arranged in the connection elements of the vibration damping device. These can either be rotating or stationary components. This execution has the benefit that the pressure device can be integrated in other operational or pressure supply devices and can use their channels.

The seals ideally comprise an elastic seal device which can counteract the axial changes in dimensions of the pressure chamber while maintaining complete sealing function.

In order provide quick additional damping, the pressure chamber ideally should constantly be full. However, this leads to a minimal friction moment while the friction clutch is not in use, due to the centrifugal force of the adjusted fluid pressure, and along with that an additional damping effect is achieved. In order to avoid this additional damping effect, means to avoid the influence of the centrifugal force in the pressure chamber are present. These include a second pressure chamber, which is arranged on the primary element's lateral surface that is turned away from the first pressure chamber and is connected to the first pressure chamber by at least one overflow channel. The second pressure chamber is axially limited by an extension of the second lateral disk of the secondary element that reaches radially to the rotation axle.

The device to dampen, especially the integrated friction clutch, can be adjustable and/or steerable and/or controllable. It has a control device with corresponding regulator. The regulator has at least one inlet, which is connected with a device to at least indirectly access a load and/or torque of a propelling engine/component with an at least indirectly characterizing size, and at least one outlet which is coupled with a regulator for at least indirect influence of the pressure in the pressure chamber.

The inventive solution is ideally used in drive trains of vehicles. However, stationary applications are also possible.

For that, the primary element can at least be coupled indirectly with the propelling engine/component during traction, and the secondary element can be torsionally fixed to the drive.

The vibration damping device, according to the invention, is characterized by a minimal need for space. By steering the damping relationship through simple shutting off of the additional damping effect or with targeted control/steering, the damping relationship can be optimally adjusted for the demands in the drive train for all operational areas. This will especially improve driving comfort when used in vehicles. Additionally, component wear is reduced.

The invention also includes a procedure to control the hysteresis of a vibration damping device where the adjustment of friction strength, dependent on the load and/or the speed of the propelling component, occurs at least in indirectly described amounts. Thus it is possible to shut off the friction clutch in operational areas of minimal load and/or high speeds of the propelling engine, while in operational areas of large loads and/or low speeds of the propelling component, the friction clutch in the vibration damping device is turned on.

BRIEF DESCRIPTION OF THE DRAWING

Illustrative embodiments of the invention are shown in the drawings, and will be further described hereafter. They show:

FIG. 4 a schematic to clarify the function of the seal;

DETAILED DESCRIPTION OF THE INVENTION

Figure 1:
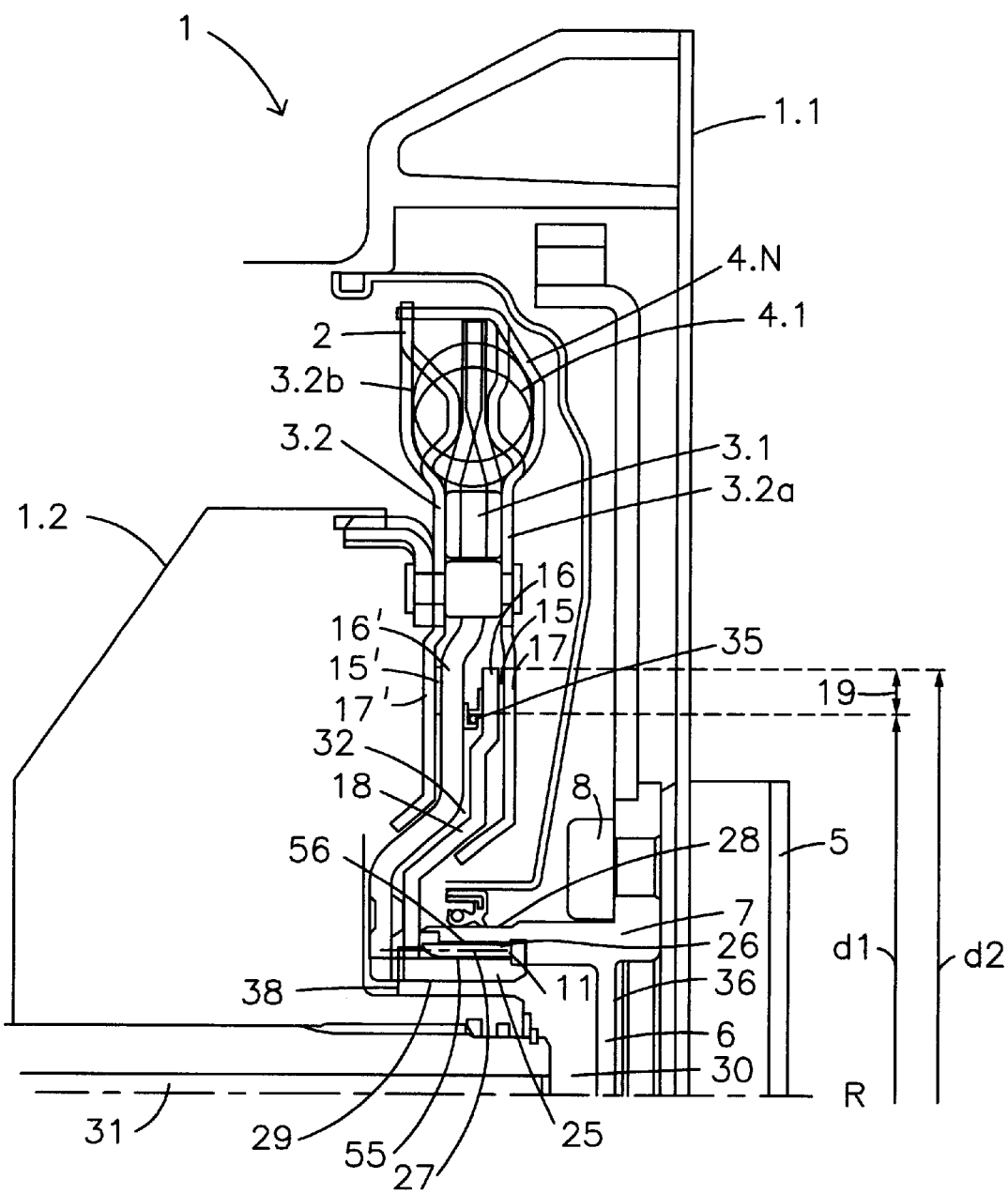
FIG. 1 a section of a drive train, chosen as an example, in axial section with a vibration damping device for a rotating component, based on the invention.
Figure 2:
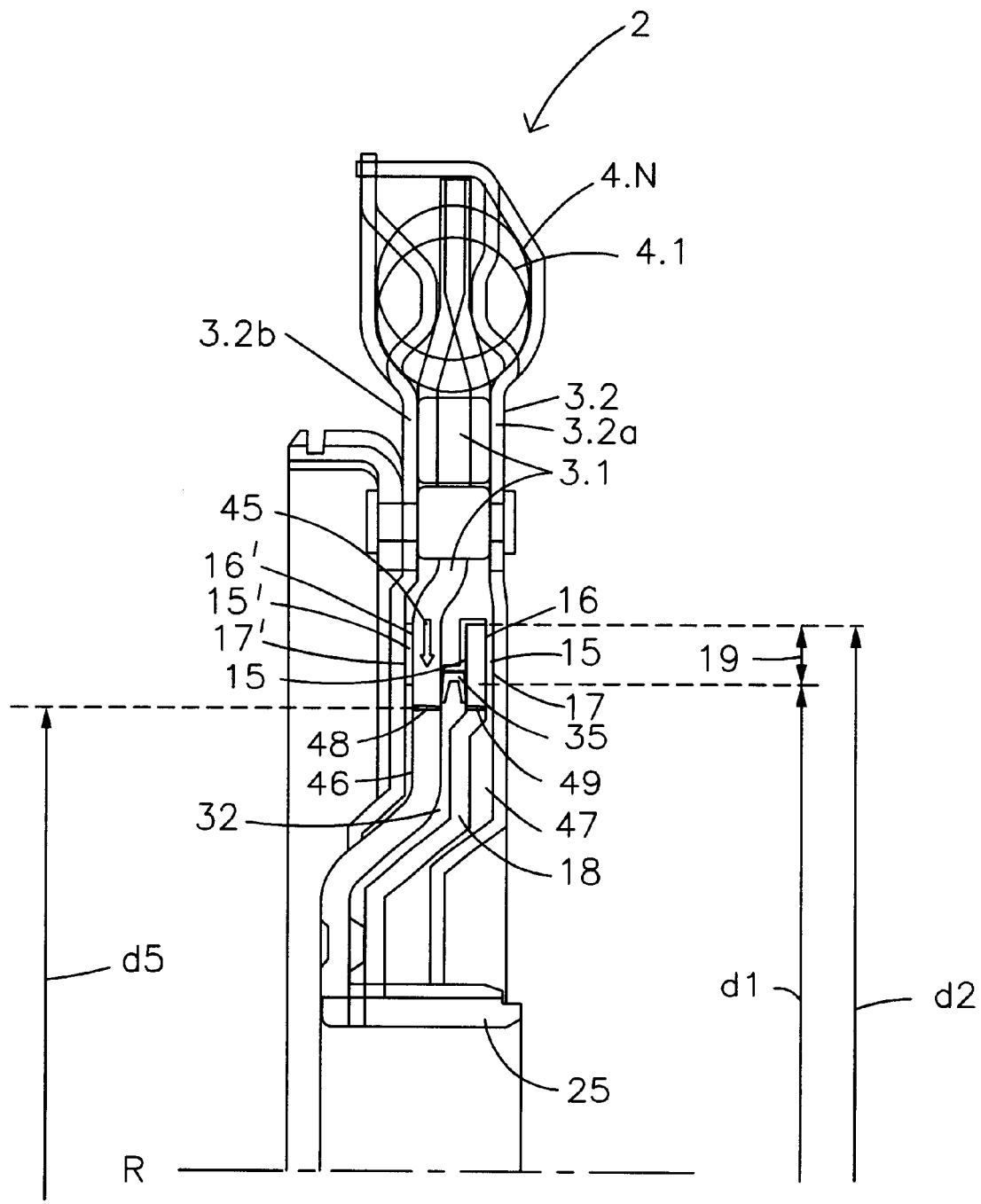
FIG. 2 a detailed view of the vibration damping device based on FIG. 1 with a beneficial seal.

FIG. 1 clearly shows, by using a section of a drive train 1 for a vehicle, one possible principal design, selected as an example, and the functions of a vibration damping device based on the invention and especially a torsional vibration damper 2 detailed in FIG. 2. The vibration damping device, especially the torsional vibration damper 2, includes a primary element 3.1 and a secondary element 3.2, which are coupled circumferentially by at least one spring assembly, ideally several spring assemblies 4.1 to 4.N, and which can be turned a limited amount relative to each other against the spring force of the spring assemblies 4.1 to 4.N.

In this case, the vibration damping device, especially the torsional vibration damper 2, is arranged between a propelling component 1.1 (not shown in detail) and a transmission component 1.2 (not shown in detail). During torque transfer in the power flow direction during traction, viewed from the propelling component to the wheels of a vehicle, the primary element 3.1 is at least indirectly torsionally fixed with the propelling side, especially the propelling component, and is therefore described as an element on the propelling side. In contrast, the secondary element 3.2 is at least indirectly fixed with the element to be propelled, and is therefore described as an element on the drive side. In FIG. 1, the primary element 3.1 is at least indirectly fixed with a drive shaft of the propelling component 1.1 (not shown here), especially crankshaft 5. The connection results using an adaptor device 6, which ideally includes an adapter shaft 7, that is fixed with crank shaft 5, and carries the primary element 3.1.

There are many possibilities in executing the fixed connection between the adapter shaft 7 and the crank shaft 5 or the adapter shaft 7 and the primary element 3.1 In this case, the fixed connection between adapter shaft 7 and crank shaft 5 is produced using fastening elements 8. In this case, the fixed connection between adapter shaft 7 and the primary element 3.1 is executed using a profile connection. In special cases, the profile connection is executed as a spline connection 11. Such a spline connection 11 has the benefit of axial moveability of the primary element 3.1 compared to the adapter shaft 7 or the following elements of the drive train 1. However, in most cases, this axial moveability is not absolutely necessary.

In the case presented above, the secondary element 3.2 is torsionally fixed with the element that is propelled, in special cases with the clutch device of the transmission component 1.2, which takes over the further torque transfer to the transmission.

Based on the invention, a clutch device, ideally a hydraulic friction clutch, is integrated into the vibration damping device. This includes at least two elements with friction surfaces, which can be brought into friction contact with each other by pressing against each other using a power generator. This power generator is designed to not only create a certain pre-defined pressure force during activation of the clutch, where the pressure force returns to zero upon deactivation, but also to steer or control the pressure force.

In the example based on FIGS. 1 and 2, the friction clutch is executed as a disk clutch 15, where this has a first ring-shaped clutch disk 16 that is on the propelling side and a second ring-shaped clutch disk 17 on the drive side, which can be brought into friction contact. The first clutch disk 16 on the propelling side forms the first element and the second clutch disk 17 on the drive side forms the second element. The first clutch disk 16 on the propelling side is carried by a piston element 18 assigned to the primary element 3.1. The second clutch disk 17 on the drive side is carried by the secondary element 3.2.

In addition, in the example described, the torsional vibration damper 2 has an additional friction clutch in the shape of a disk clutch 15'.

The disk clutch 15' has a first clutch disk 16' on the propelling side and a second ring-shaped clutch disk 17' on the drive side, that can be brought into friction contact. The first clutch disk 16' on the propelling side forms the first and the second clutch disk 17' on the drive side forms the second of the elements that rub together. The second clutch disk 17' on the drive side is carried by the second lateral disk 3.2b of the secondary element 3.2, the first clutch disk 16' on the propelling side by the primary element 3.1.

In the execution example, the radial friction engagement between the first clutch disk 16 on the propelling side and the second clutch disk 17 on the drive side as well as between the first clutch disk 16' on the propelling side and the second clutch disk 17' on the drive side is produced in the shared area 19, which can be described by each interior diameter d1 and outer diameter d2 of the clutch disks 16 and 17 or 16' and 17', in order to obtain even power distribution. There are corresponding striking surfaces in component area 19. These can either be formed by the clutch disks 16 and 17 or 16' and 17' themselves or by corresponding friction linings, which are applied to the clutch disks 16 and 17 or 16' and 17' in the component area 19. It is not absolutely necessary to provide both friction contact surfaces with friction linings, it would be enough for one of them to have a friction lining.

Therefore, the physical arrangement of the primary element 3.1 occurs in axial direction between the secondary element 3.2 and the clutch disk 16 on the propelling side. The clutch disk 16 on the propelling side is also arranged between the primary element 3.1 and the secondary element 3.2. The design of the secondary element 3.2 occurs in such a manner that it extends in radial direction to the symmetry axle of the drive train 1, especially to the rotational axel of the crank shaft 5 in the area of the friction contact to be produced between the clutch disk 16 on the propelling side and the primary element 3.2.

In order to produce friction contact between the clutch disks 16 or 16' and the clutch disks 17 or 17', the first clutch disk 16 or 16' on the propelling side is executed axially movable opposite the primary element 3.1 and therefore the clutch disk 17 or 17' on the drive side. This moveability can be executed in different ways. In the case presented, the axial movement is ensured using a so-called spline connection 11. Free from axial securing devices, it is possible to push on the one side of the clutch disk 16 on the propelling side with corresponding power impingement of this in axial direction against the primary element 3.1 and to press it, depending on the force expended, more or less strongly against the clutch disk 17 on the drive side, and in doing so to change the friction force. On the other hand, the primary element 3.1 can also be pressed against the second lateral disk 3.2b or the secondary element 32, so that variable pressure between the clutch disk 16' and the clutch disk 17' is possible.

The entire connection between the clutch disk 16 on the propelling side to the primary element 3.1 and to the crankshaft 5 is implemented as follows, based on FIG. 1 in the execution example. The primary element 3.1 has a circumferential projection 25 extending axially. It has teeth 27 at its outer circumference 26 in relation to the rotation or symmetrical axle R of the torsional vibration damper 2. In additional, the adapter shaft 7 as well as the first clutch disk 16 on the propelling side have teeth 55 or 56 on each of their inner circumferences 28 and 29 which are complementary to the teeth 27. These teeth 27, 55 and 56 form the spline connection 11 between the adapter shaft 7 and the primary element 3.1.

A pressure device 30 is present to implement the pressure of the first clutch disk 16 or 16' on the propelling side on the clutch disk 17 or 17' on the drive side. The pressure device 30 includes at least one pressure conduction channel 31. This pressure conduction channel 31 provides a pressure medium for a pressure chamber 32, which is formed between the primary element 3.1 and the clutch disk 16 on the propelling side.

A radial seal between the primary element 3.1 and the clutch disk 16 on the propelling side is present to form a pressure chamber 32. This seal 35 is movable in such a manner that a change in the axial distance between the primary element 3.1 and the clutch disk 16 on the propelling side still ensures a tight seal. The situation and warping of the seal 35 in a non-pressure condition can be seen in FIG. 4a), the sealing effect in a pressurized condition can be seen in FIG. 4b).

Each pressure conduction channel 31 includes at least a section 36 which is worked in to the adapter shaft 7 and can be filled with the pressure medium. In addition, there are conduction lines which are assigned to the pressure channels 31. The conversion from section 36 to pressure chamber 32 occurs using a corresponding inner width 38, which is worked into the projection 25 and connects the pressure chamber 32 to the section 36. The design or arrangement of the elements placed under the torsional vibration damper 2 is chosen in such a manner that secure conduction of the pressure medium in the pressure chamber 32 is constantly ensured. Specifically, this means that corresponding sealed chambers are present.

In the following, the function of a torsional vibration damper 2, based on the invention, is detailed. Not only the piston 18 but also the primary element 3.1 are axially moved (oppositely) when the pressure medium (pressure oil) strikes the pressure chamber 32. The piston 18 in direction of the lateral disks 3.2a, the primary element 3.1 in direction of the lateral disk 3.2b. In this manner, the axial forces are balanced. Both clutches 15 and 15' work in the area 19 between the diameters d1 and d2.

Pressure of the second lateral disk 3.2b against the primary element 3.1 occurs due to the clutch between the lateral disk 3.2a with the lateral disk 3.2b of the secondary element 3.2. This makes it possible for a part of the torque that is to be transferred from the crankshaft 5 in the drive train 1, while bypassing the spring assemblies 4.1 to 4.N, to be transferred to the secondary element 3.2. Thus the realization of friction moment which brings a damping effect is changed as compared to a conventional execution without integrated friction clutch. Steering the friction moment that can be achieved occurs using the amount of the pressure p developing in the pressure chamber 32.

Figure 3:
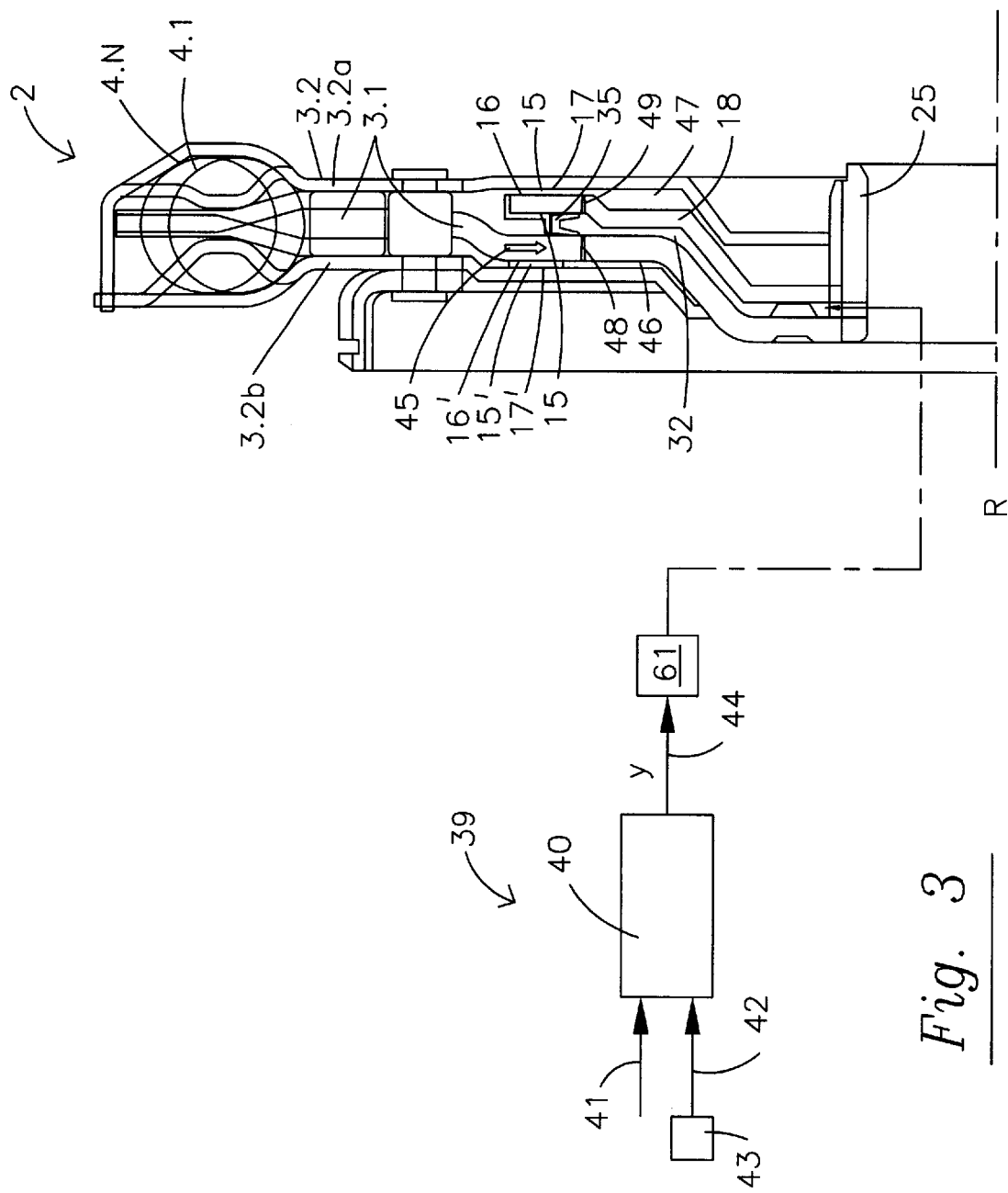
FIG. 3 a block FIG. of a beneficial control concept.

FIG. 3 shows a block diagram of a control device 39 to control the friction moment. This control device 39 is a component of a power generator to produce a controlled friction contact of the elements rubbing together. It consists mainly of a regulator 40, which has at least two inlets 41 and 42. The first inlet 41 is at least indirectly coupled with a device to access and/or pass on at least indirectly a described amount of the speed and/or rotations of the propelling engine, while the second inlet 42 is connected with a device to access or at least indirectly establish the current load condition of the propelling engine. For example, a sensor could serve to establish the load distribution setting 43. In addition, the regulator 40 includes at least one outlet 44 to provide a controller output Y to strike or act on a device to provide a corresponding pressure p in the pressure chamber 32. The regulator can be executed in different ways, the only important thing is that the system to provide the pressure medium 30 has corresponding regulators 61, which can influence the amount of pressure p in the pressure chamber 32. Transmitting the required pressure p to be set in the pressure chamber 32 in the steering device occurs using corresponding devices in the steering device 40, which allocate corresponding to the input quantity.

Ideally, one of the other aspects of the invention includes having the pressure chamber 32, which is flooded with pressure medium, constantly filled with the pressure medium in order to ensure quick responsiveness of the torsional vibration damper 2 and to easily influence the damping relationship. However, during operation, this affects the drive train 1, which means that a rotating fluid ring is formed by centrifugal force during power transmission during traction of the propelling engine 1.1 to drive the vehicle, which would lead to this influence even in situations in which no influence of the damping relationship is desired. For this reason, medium 45 is used to avoid the effect of the influence of centrifugal force. Concretely, this means that both sides of the primary element 3.1 are set to the same pressure relationship, so that no connection occurs between primary and secondary element 3.1 and 3.2 using the pressure medium. The pressure medium found in the pressure chamber 32 is used to balance the pressure. For this reason, two counter-pressure chambers 46 and 47, which are allocated to the pressure chamber 32 on both sides, surround the medium 45 to avoid the effect of the influence of centrifugal force. The counter-pressure chamber 46 is formed by primary element 3.1 and the lateral disk 3.2b of the secondary element. The counter-pressure chamber 47 is, as is shown in FIG. 2, formed by the lateral disk 3.2a of the secondary element 3.2 and the clutch disk 16 on the propelling side.

To conduct pressure medium to the counter-pressure chambers 46 and 47 in corresponding relationship to the pressure medium filling the pressure chamber 32, there are corresponding conversion bores 48 and 49, which connect the pressure chamber 32 with the counter-pressure chamber 46 and counter-pressure chamber 47. These conversion bores are worked into the primary element 3.1 and the clutch disk 16 on the propelling side. For even distribution, the conversion outlets 48 and 49 are arranged in the same circumferential relationship to the specific diameter d5 of the clutch disk 16 on the propelling side and of the primary element 3.1. The conversion outlets 48 and 49 have the same cross-section. The lateral disks 3.2a and 3.2b are extended radially in the direction towards the damping symmetry axle R to form the pressure chambers 46 or 47, so that they can produced the desired pressure relationship. The conversion of pressure medium from the pressure chamber 32 occurs during operation from the rotating fluid ring in the pressure chamber 32 into the counter-pressure chamber 46 and 47.

The designs shown in FIGS. 1 to 4 for the integrating the hydraulic friction clutch 15 into the vibration damping device, especially of the torsional vibration damper 2, represent ideal executions, yet don't limit the main idea of integrating the friction clutch into the damping device 2. Other possible embodiments, which utilize the core idea of the invention, are also possible. These depend on the concrete use requirements and should be judged by a competent expert.

Using a comparison, FIGS. 5a) and b) illustrate two characteristics of damping of a conventional vibration damping device with integrated friction clutch 15 and 15' at low operational speeds. FIG. 5a) shows the relationship of a conventional torsional vibration damper 2'; FIG. 5b) shows the damping relationship of a torsional vibration damper 2 based on the invention using FIG. 1 and FIG. 2.

A torsional vibration damper 2' according to prior art (shown in FIG. 5a) and a torsional vibration damper based on the invention (shown in FIG. 5b) are used for comparison. The significant characteristics of each torsional vibration damper 2 and 2' are characterized with reference marks.

As can be seen in FIG. 5a), the conventional torsional vibration damper 2' includes a primary element 3.1' which is mainly rotationally symmetrical and a secondary element 3.2' which is also rotationally symmetrical. The primary element 3.1' and the secondary element 3.2' are coupled together using N' spring assemblies 4.1' to 4.N' arranged circumferentially in relation to a rotational axis R', so that the primary element 3.1' can be turned to a limited extent relative to the secondary element 3.2', against the spring force of this spring assembly 4.1' to 4.N'. For clarity, the direction of power flow from a propelling unit to a transmission component during power transmission during traction is drawn in with arrows, designated with a K'.

FIG. 5b) shows a torsional vibration damper 2 based on the invention's FIGS. 1 and 2, with the important characteristics characterized by reference marks, namely the primary and secondary elements 3.1 and 3.2 coupled by spring assemblies 4.1 to 4.N, the disk clutch(es) 15 (and 15') that can be switched with the piston element 18 and arranged in pressure chamber 32 between the piston 18 and the primary element 3.1, which transmits pressure medium using the pressure device 30. Analogous to the conventional torsional vibration damper 2' shown in FIG. 5a), the direction of power flow is also marked using arrows referenced with K. The rotation symmetry of the entire arrangement occurs in relation to the rotational axis R.

In the example based on FIG. 5, both torsional vibration dampers 2 and 2' are struck with an average speed of 280 rpm on the propelling side. In addition, the torsional vibration dampers 2 and 2' are stimulated into vibration, where the period of vibration amounts to 100 msec. The speed varies sinusoidally in the speeds between 260 and 300 rpm due to this vibration stimulus. The variation in time of the incoming speeds of the two torsional vibration dampers 2 and 2' are shown in FIG. 5 and are designated with the reference EK (conventional torsional vibration damper 2') and EE (torsional vibration damper 2 based on the invention).

As a result of this variation of the incoming speed EK, the conventional torsional vibration damper is stimulated by resonance, as it were. The speed varies in the speeds between 180 and 400 rpm due to this resonance stimulus. This output speed variation of conventional torsional vibration damper 2' is shown in FIG. 5a) and is designated with the reference AK.

In comparison, there is no resonant stimulus in the torsional vibration damper 2 based on FIGS. 1, 2 and 5b). The output speed $A_E$ extensively follows the input speed $E_E$ the torsional vibration damper 2: $A_E \approx E_E$.

Figure 5C:
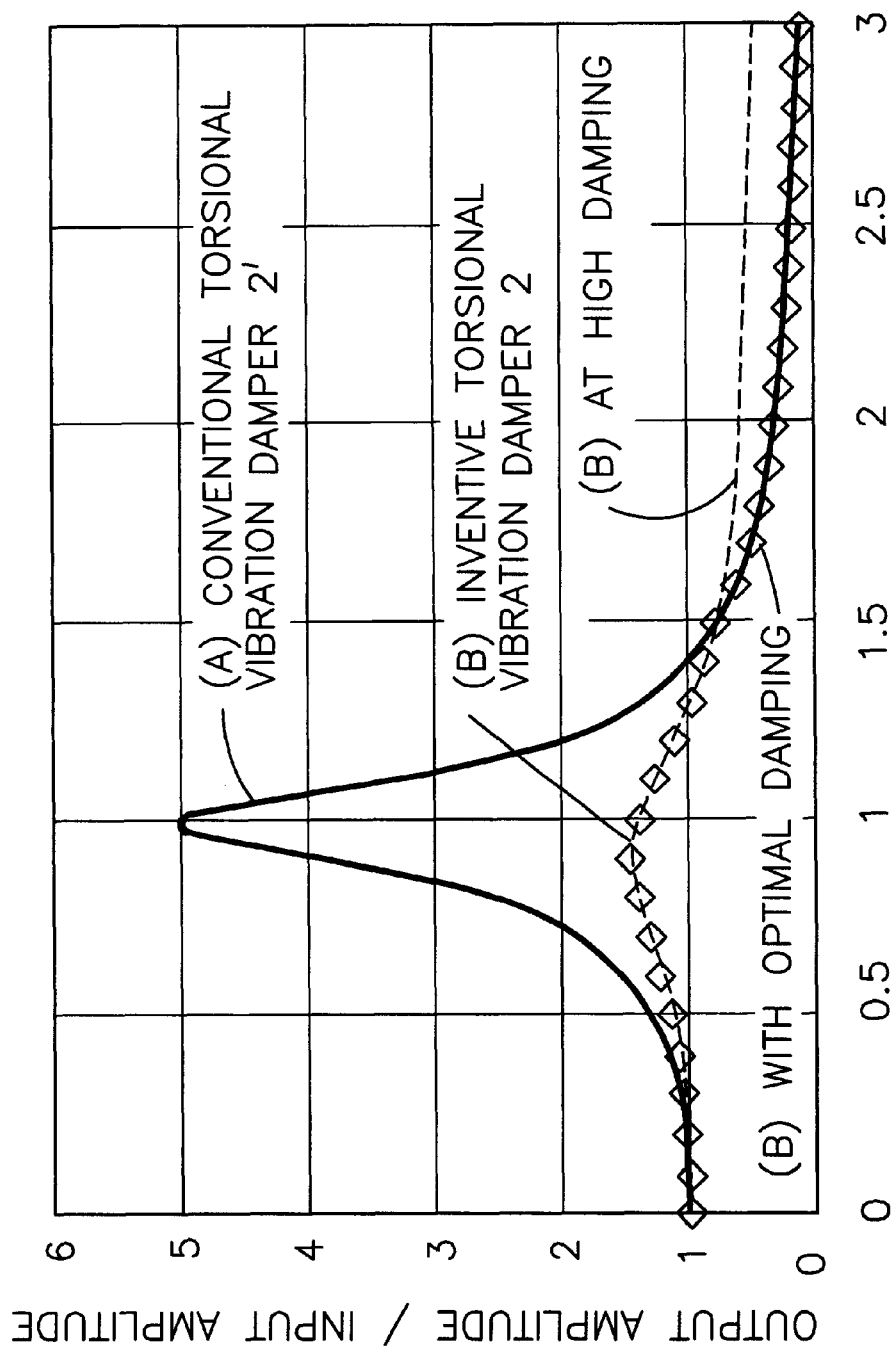
FIG. 5 a comparison of the influence of hysteresis on the vibration amplitudes of a conventional vibration damping device and a vibration damping device designed on the basis of the invention.

FIG. 5c) shows a simplified representation of the vibration behavior of the torsional vibration damper 2 based on the invention as shown in FIGS. 1, 2 and 5b), compared with the vibration behavior of a conventional torsional vibration damper 2' based on FIG. 5a), dependent on speed. For this purpose, FIG. 5c) represents the relationship of the output vibrational amplitude to the input vibrational amplitude, dependent on the speed standardized to the resonant speed of the conventional torsional vibration damper 2'.

FIG. 5c) shows that the conventional torsional vibration damper 2' predominantly follows the speed of the propelling side at lower speeds on the drive side. In the area of resonance frequency of the spring system (spring assemblies 4.1' to 4.N'), the speed fluctuations on the propelling side lead to speed variations on the drive side on a wider scale. The damping effect of the spring system on the spring assembly 4.1 to 4.N can't be observed without high speeds. This is clear in FIG. 5c), in that the amplitude relationship of the output speed variation to the input speed variation lies under the value of "1" and practically disappears for very high speeds.

In contrast, in a torsional vibration damper based on the invention, the drive side output speeds mostly follow the propelling side input speeds with lower or medium propelling side input speeds. The damping relationship at high propelling side input speed remains mostly unchanged.

Numbered Reference List

1 Drive train
1.1 Propelling unit
1.2 Transmission component
2, 2' Torsional vibration damper
3.1, 3.1' Primary element (propelling side element)
3.2, 3.2' Secondary element (drive side element)
3.2a First lateral disk of the secondary element
3.2b Second lateral disk of the secondary element
4.1 to 4.N Spring assemblies
4.1' to 4.N' Spring assemblies
5 Crank shaft
6 Adapter
7 Adapter shaft
8 Fastening elements
11 Spline connection
15, 15' Disk clutch
16, 16' Clutch disk on propelling side
17, 17' Clutch disk on drive side
18 Piston element
19 Area
25 Projection
26 Outer circumference
27 Teeth
28 Inner circumference
29 Inner circumference
30 Pressure device
31 Pressure conduction channel
32 Pressure chamber
35 Sealing element
36 Section
38 Inner width
39 Control device
40 Regulator
41 first inlet
42 second inlet
43 Sensor to establish load distribution setting
44 Outlet
45 Medium to avoid the effect of the influence of centrifugal force
46 Counter-pressure chamber
47 Counter-pressure chamber
48 Conversion outlet
49 Conversion outlet
55 Teeth of the propelling side clutch disk
56 Teeth of the adapter shaft
61 Adjustor
$d_1$ Inner diameter
$d_2$ Outer diameter
$d_5$ Diameter
p Pressure in pressure chamber
EK Incoming speed of conventional torsional vibration damper
$A_K$ Outgoing speed of conventional torsional vibration damper
$E_E$ Incoming speed of torsional vibration damper based on invention
$A_E$ Outgoing speed of torsional vibration damper based on invention
R, R' Rotational axis
K, K' Direction of power flow N, N' Number of spring assemblies
Y Controller output

What is claim is:

1. A torsional vibration damper (2), comprising:
   a primary rotatable element (3.1);
   a secondary element (3.2) rotatable relative to the primary element (3.1);
   at least one spring device (4.1, 4.N) for torsionally elastic coupling said primary element and secondary element to each other; at least one adjustable clutch device (15, 15'), including at least two elements (16, 17; 16', 17') adapted for frictional engagement with each other, which bring primary and secondary elements (3.1, 3.2) into friction contact; and
   a force producing device (39) for producing a controlled frictional engagement of the elements frictionally engaging each other (16, 17; 16', 17').

2. A torsional vibration damper as in claim 1, wherein at least one element of the clutch device (15) is formed by the primary and/or secondary element (3.1, 3.2).

3. A torsional vibration damper as in claim 2, wherein an additional element of the clutch device (15) is formed by one piston element (18), which can be torsionally fixed to the primary element (3.1) and is, in the installed position, axially movable.

4. A torsional vibration damper as in claim 1, wherein:
   the secondary element (3.2) includes at least first and second lateral disks (3.2a, 3.2b) which can be torsionally fixed to each other;
   the primary element (3.1) is arranged axially, in the installed position, between the two lateral disks (3.2a, 3.2b); and
   one element of the clutch device (15) is formed by at least one of the two lateral disks (3.1a, 3.2b) of the secondary element.

5. A torsional vibration damper as in claim 4, wherein:
   one element of the clutch device (15') is formed by the second lateral disk (3.2a, 3.2b) of the secondary element; and
   a second element of the clutch device (15') is formed by the primary element (3.1).

6. A torsional vibration damper as in claim 1, wherein the clutch device is a disk clutch (15, 15').

7. A torsional vibration damper as in claim 6, wherein:
   the frictionally engaging surfaces of the individual elements (16, 17; 16', 17') are respectively arranged, in the radial direction, in an area (19) which can be described by an inner diameter $d_1$ and an outer diameter $d_2$.

8. A torsional vibration damper as in claim 1, wherein the clutch device (15, 15') is hydraulically operated.

9. A torsional vibration damper as in claim 8, wherein:
   the force producing device (39) to produce a controllable pressure of the elements rubbing against each other (16, 17 or 16' and 17') includes at least an operational device to produce the friction contact between the elements rubbing against each other (16, 17 or 16' and 17); and
   the operational device includes a pressure device (30) which acts on a pressure chamber (32) with pressure medium to produce the friction contact between the elements with striking surfaces (16, 17 or 16' and 17').

10. A torsional vibration damper as in claim 9, wherein:
    the pressure chamber (32) is formed between the piston element (3.1) that is torsionally fixed to the primary element, and in the installed position can be moved axially, and the primary element; and
    sealing elements (35) are provided to radially seal the pressure chamber (32).

11. A torsional vibration damper as in claim 10, wherein the sealing elements include an elastic sealing element (35), which compensates changes in the axial dimensions of the pressure chamber (32).

12. A torsional vibration damper as in claim 9, further including a means (45) to preclude the influence of centrifugal force in the pressure chamber (32).

13. A torsional vibration damper as in claim 12, wherein:
    there is at least one counter-pressure chamber (46), which is arranged at the lateral surface of the primary element that is facing away from the first pressure chamber (32);
    the pressure chamber (32) and the counter-pressure chamber (46) are connected to each other by at least one overflow channel (47).

14. A torsional vibration damper as in claim 13, wherein the counter-pressure chamber (46) is limited in the axially direction by an extension of the second lateral disk (3.2b) of the secondary element (3.2) extending radially to the rotational axis (R).

15. A torsional vibration damper as in claim 9, wherein:
    the force producing device includes at least one control device (39), which includes a regulator (40),
    the regulator (40) has at least one inlet, which is connected with a device to access an amount of the load and/or speed of a propelling component (1.1);
    the regulator (40) has at least one outlet (44) which is coupled to an adjustor (61) to influence the pressure (p) in the pressure chamber (32).

16. A torsional vibration damper as in claim 1,
    wherein the primary element (3.1), in the installation condition in a drive train (1), in the power flow direction (K) during traction, is at least indirectly coupled with the propelling unit (1.1), and
    wherein the secondary element (3.2) is fixed to the drive (1.2).

17. A torsional vibration damper as in claim 1,
    wherein the secondary element (3.2), in the installation condition in a drive train (1) in power flow direction (K) during traction, is at least indirectly coupled with the propelling unit (1.1), and
    wherein the primary element (3.1) is fixed to the drive (1.2).

18. A propulsion system for vehicles with a torsional vibration damper, said torsional vibration damper (2) comprising:
    a primary rotatable element (3.1);
    a secondary element (3.2) rotatable relative to the primary element (3.1);
    at least one spring device (4.1, 4.N) for torsionally elastic coupling said primary element and secondary element to each other;
    at least one adjustable clutch device (15, 15'), including at least two elements (16, 17; 16', 17') adapted for frictional engagement with each other, which bring primary and secondary elements (3.1, 3.2) into friction contact; and
    a force producing device (39) for producing a controlled frictional engagement of the elements frictionally engaging each other (16, 17; 16', 17').

19. A propulsion system as in claim 18, wherein the vibration damping device is integrated into the transmission (1.2).

20. A process for controlling hysteresis of a torsional vibration damper, said torsional vibration damper (2) comprising:
   a primary rotatable element (3.1);
   a secondary element (3.2) rotatable relative to the primary element (3.1);
   at least one spring device (4.1, 4.N) for torsionally elastic coupling said primary element and secondary element to each other;
   at least one adjustable clutch device (15, 15'), including at least two elements (16, 17; 16', 17') adapted for frictional engagement with each other, which bring primary and secondary elements (3.1, 3.2) into friction contact; and
   a force producing device (39) for producing a controlled frictional engagement of the elements frictionally engaging each other (16, 17; 16', 17'); and
   said process comprising adjusting the strength of the frictional engagement dependent on the load and/or the speed of a propelling component (1.1).

21. A process as in claim 20, wherein:
   when the propelling unit (1.1) is operating under minimal load and/or high speed, the adjustable clutch device (15, 15') is disengaged;
   when the propelling unit (1.1) is operating under large load and/or low speed the adjustable clutch device (15, 15') is engaged.

22. A vibration damping device, comprising:
   a primary rotatable element (3.1);
   a secondary element (3.2) rotatable relative to the primary element (3.1);
   at least one spring device (4.1, 4.N) for torsionally elastic coupling said primary element and secondary element to each other;
   at least one adjustable clutch device (15, 15'), including at least two elements (16, 17; 16', 17') adapted for frictional engagement with each other, which bring primary and secondary elements (3.1, 3.2) into friction contact; and
   a force producing device (39) for producing a controlled frictional engagement of the elements frictionally engaging each other (16, 17; 16', 17').

* * * * *